United States Patent
Kishi

(10) Patent No.: US 10,875,481 B2
(45) Date of Patent: Dec. 29, 2020

(54) MOUNTING STRUCTURE FOR EXTERNAL ENVIRONMENT DETECTION DEVICE FOR VEHICLE

(71) Applicant: HONDA MOTOR CO., LTD., Tokyo (JP)

(72) Inventor: Shinichi Kishi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 39 days.

(21) Appl. No.: 16/475,863

(22) PCT Filed: Jan. 12, 2018

(86) PCT No.: PCT/JP2018/000585
§ 371 (c)(1),
(2) Date: Jul. 3, 2019

(87) PCT Pub. No.: WO2018/146992
PCT Pub. Date: Aug. 16, 2018

(65) Prior Publication Data
US 2019/0351857 A1 Nov. 21, 2019

(30) Foreign Application Priority Data
Feb. 9, 2017 (JP) .................. 2017-022151

(51) Int. Cl.
*B60J 7/00* (2006.01)
*B60R 19/48* (2006.01)
(Continued)

(52) U.S. Cl.
CPC .............. *B60R 19/48* (2013.01); *B60R 13/04* (2013.01); *B60R 19/04* (2013.01); *B60R 21/01* (2013.01);
(Continued)

(58) Field of Classification Search
CPC ..... B60R 19/26; B62D 43/02; B29C 45/0017; B29C 45/14639; B29C 45/14754;
(Continued)

(56) References Cited

U.S. PATENT DOCUMENTS 6,572,161 B2 6/2003 Wild et al.
10,150,416 B2 * 12/2018 Masckauchan ........... B60R 1/12
(Continued)

FOREIGN PATENT DOCUMENTS

DE 102012214326 A1 5/2014
EP 1249372 A2 10/2002
(Continued)

OTHER PUBLICATIONS

Extended European Search Report for EP application No. 18752041.6, dated Oct. 15, 2019, 7 pages.
(Continued)

*Primary Examiner* — Kiran B Patel
(74) *Attorney, Agent, or Firm* — Armstrong Teasdale LLP

(57) ABSTRACT

The mounting position or the mounting angle of an external environment detection device relative to a vehicle body is prevented from changing even after experiencing a light collision, and a favorable external appearance of the vehicle body in a mounting part of the external environment detection device is ensured. A mounting structure includes a bumper side garnish (42) having an opening (44) facing a prescribed detecting direction of a laser radar device (38), and a device side garnish (46) extending from an outer periphery of the detection device, and including a lip (50) that overlaps with an opening edge (44) of the bumper side garnish (42) located on a periphery (44A) of the opening (44).

13 Claims, 8 Drawing Sheets

(51) Int. Cl.
*B60R 13/04* (2006.01)
*B60R 19/04* (2006.01)
*B60R 21/01* (2006.01)
*B62D 25/08* (2006.01)

(52) U.S. Cl.
CPC .... *B62D 25/08* (2013.01); *B60R 2021/01006* (2013.01)

(58) Field of Classification Search
CPC ......... G01S 13/931; G01S 2013/93275; G01S 2007/027; G01S 2013/93272; H01Q 1/3233
See application file for complete search history.

(56) References Cited

U.S. PATENT DOCUMENTS

| | | | |
|---|---|---|---|
| 10,442,402 B2 * | 10/2019 | Schmidt | B60S 1/0888 |
| 2005/0104392 A1 | 5/2005 | Liebhard et al. | |
| 2006/0072008 A1 | 4/2006 | Miyazaki et al. | |
| 2006/0087132 A1 * | 4/2006 | Tanabe | B60R 21/013 |
| | | | 293/4 |
| 2007/0043507 A1 * | 2/2007 | Tobaru | B60R 19/483 |
| | | | 701/301 |
| 2012/0200121 A1 | 8/2012 | Wuerfel | |
| 2016/0052451 A1 * | 2/2016 | O'Kane | G01S 7/4813 |
| | | | 340/435 |
| 2017/0285168 A1 * | 10/2017 | Nakagawa | G01S 15/931 |
| 2018/0100738 A1 * | 4/2018 | Ichiyanagi | G01C 3/02 |
| 2019/0162947 A1 * | 5/2019 | Low | G02B 27/143 |
| 2019/0293460 A1 * | 9/2019 | Kato | B62D 21/152 |
| 2019/0324119 A1 * | 10/2019 | Matori | G01S 7/03 |
| 2019/0324120 A1 * | 10/2019 | Matori | G01S 7/03 |
| 2020/0191918 A1 * | 6/2020 | Ellgas | G01S 7/4813 |
| 2020/0198566 A1 * | 6/2020 | Purushothaman | B60J 5/04 |

FOREIGN PATENT DOCUMENTS

| | | |
|---|---|---|
| JP | H1044891 A | 2/1998 |
| JP | H10114249 A | 5/1998 |
| JP | 2000016161 A | 1/2000 |
| JP | 2003291717 A | 10/2003 |
| JP | 2006103533 A | 4/2006 |
| JP | 2012218636 A | 11/2012 |
| JP | 2014119302 A | 6/2014 |
| JP | 2015077826 A | 4/2015 |

OTHER PUBLICATIONS

English translation of International Search Report for International Application No. PCT/JP2018/000585, dated Apr. 10, 2018, 2 pages.

* cited by examiner

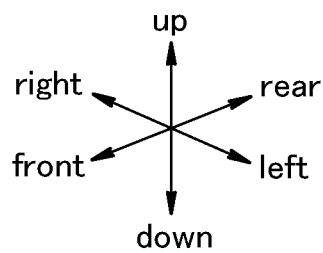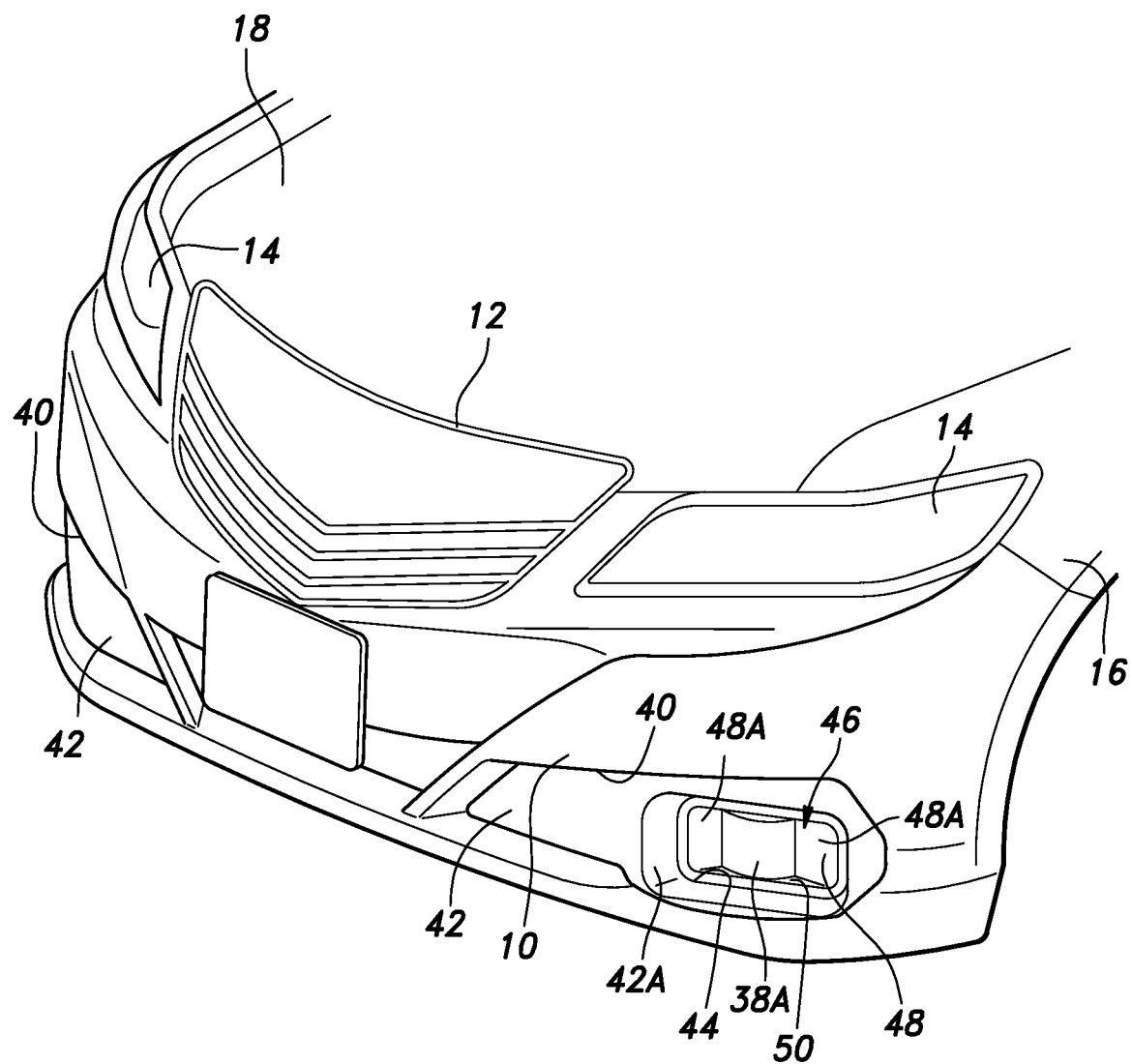
Fig.1

MOUNTING STRUCTURE FOR EXTERNAL ENVIRONMENT DETECTION DEVICE FOR VEHICLE

CROSS-REFERENCE TO RELATED APPLICATIONS

This application is a U.S. National Phase Application of PCT/JP2018/000585, filed Jan. 12, 2018, which claims the benefit of priority to JP Application No. 2017022151, filed Feb. 9, 2017, the contents of which are hereby expressly incorporated by reference in their entirety.

TECHNICAL FIELD

The present invention relates to a mounting structure for an external environment detection device for a vehicle, and more particularly to a mounting structure for an external environment detection device such as a radar device and a camera.

In a known mounting structure for an onboard camera, the camera is attached to a front part of a front lower cross member via a bracket, and an opening is formed in a part of a front bumper face opposing the camera to provide a viewing window for the camera (see Patent Document 1, for instance). In another known mounting structure for an onboard camera, the camera is attached to a front grille (see Patent Document 2, for instance).

PRIOR ART DOCUMENT(S)

Patent Documents

Patent Document 1: JP2006-103533A
Patent Document 2: DE102012214326A1

SUMMARY OF THE INVENTION

Task to be Accomplished by the Invention

In the case where the camera is attached to the front lower cross member, when the front bumper face vibrates or moves when the vehicle is traveling or when the bumper face lightly collides with an external object, owing to a spacing created between the camera and the bumper face along the edge of the opening in the front bumper face, the mounting position or the mounting angle of the camera relative to the vehicle body is prevented from changing. However, the gap between the camera and the front bumper face impairs the external appearance of the vehicle body.

In the case where the external environment detection device is attached to the front grille, even a light frontal collision can cause the mounting position or the mounting angle of the camera relative to the vehicle body to change owing to a deformation of the front grille or the like so that the camera may be prevented from functioning properly as initially installed. Also, if the front grille is made of plastic material, the deformation of the front grille over time may cause the mounting position or the mounting angle of the camera relative to the vehicle body to change, and this may also prevent the camera from functioning properly as initially installed.

An object to be achieved by the present invention is to prevent the mounting position or the mounting angle of an external environment detection device relative to a vehicle body from changing even after experiencing a light collision, and ensure a favorable external appearance of the vehicle body in a mounting part of the external environment detection device.

Means to Accomplish the Task

A mounting structure for an external environment detection device for a vehicle according to the present invention is a mounting structure for mounting an external environment detection device (38, 60, 80) for a vehicle to a vehicle body so as to face a prescribed detecting direction, comprising: a cover member (42, 66) covering an exterior of the vehicle body and having an opening (44, 68, 86) facing the prescribed detecting direction of the detection device (38, 60, 80); and a device side garnish (46, 70, 88) extending from an outer periphery of the detection device (38, 60, 80), and including a lip (50, 72, 90) that overlaps with an opening edge of the cover member (42, 66) located on a periphery of the opening (44, 68, 86).

According to this configuration, the gap between the cover member (42, 66) and the detection device (38, 60, 80) is closed by the lip (50, 72, 90) so that the external appearance of this part as viewed from the front can be improved. Since the cover member (42, 66) and the detection device (38, 60, 80) are not mechanically connected to each other, and can thereby move relative to each other, even when the cover member (42, 66) is pushed by lightly colliding with an object, the mounting position or the mounting angle of the detection device (38, 60, 80) is prevented from changing.

In the mounting structure for mounting an external environment detection device according to the present invention, the lip (50, 72, 90) may engage the opening edge of the cover member (42, 66) either from inside or from outside. In either case, the external appearance of this part as seen from the front can be improved.

In the mounting structure for mounting an external environment detection device according to the present invention, preferably, the lip (50, 72, 90) is made of rubber-like material such as elastomeric material.

According to this configuration, the lip (50, 72, 90) can be urged against the opening edge of the cover member (42, 66) in an overlapping relationship so that the gap between the cover member (42, 66) and the detection device (38, 60, 80) can be closed in a reliable manner.

In the mounting structure for mounting an external environment detection device according to the present invention, preferably, the device side garnish (46) includes a relatively rigid inner part (48) fixedly attached to the outer periphery of the detection device (38), and an outer part constituting the lip (50) made of elastomeric material.

According to this configuration, the device side garnish (46) can be attached to the detection device (38) at the inner part (48) of the device side garnish in a reliable manner, and the lip (50) can be pushed against the opening edge of the cover member (42) in an overlapping relationship so that the gap between the cover member (42) and the detection device (38) can be closed in a reliable manner.

In the mounting structure for mounting an external environment detection device according to the present invention, preferably, the inner part (48) is shaped to define an inclined surface (48A) that diverges outward in the detecting direction.

According to this configuration, the detecting range of the detection device (38) can be expanded.

In the mounting structure for mounting an external environment detection device according to the present invention, preferably, the opening edge of the cover member (42) is shaped to define an inclined surface (42B) that diverges outward in the detecting direction.

According to this configuration, the detecting range of the detection device (38) can be expanded.

In the mounting structure for mounting an external environment detection device according to the present invention, preferably, the cover member consists of a bumper face (66) or a bumper side garnish (42) attached to the bumper face (66).

In the mounting structure for mounting an external environment detection device according to the present invention, preferably, the lip (90) includes a lower extension (92) extending to a lower wall of the bumper face (66) that extends inward from a lower edge of the bumper face.

According to this configuration, the position of the detection device (80) can be lowered so that the detection range of the detection device (80) can be expanded.

In the mounting structure for mounting an external environment detection device according to the present invention, preferably, the vehicle body comprises a pair of extension members (24, 26) extending from a front end of a front side frame (20) and a front end of an upper member (22), respectively, to support a front bumper beam (28), and a connecting plate (30) connecting the extension members (24, 26) to each other, and the bumper face is a front bumper face (10), the detection device (38) being attached to the connecting plate (30) via a bracket (36).

According to this configuration, the presence of the detection device (38) is prevented from adversely affecting the impact absorbing performance of the extension members (24, 26).

In one embodiment of the mounting structure for mounting an external environment detection device according to the present invention, the bumper face is a rear bumper face (66), and the detection device (60) is attached to a rear fender (64) defining a rear side face of the vehicle body via a bracket (62).

In one embodiment of the mounting structure for mounting an external environment detection device according to the present invention, the bumper face is a rear bumper face (66), and the detection device (70) is attached to a rear panel (84) defining a rear end face of the vehicle body via a bracket (82).

Background Art

The mounting structure for mounting an external environment detection device according to the present invention prevents the mounting position or the mounting angle of the external environment detection device relative to the vehicle body from changing even after experiencing a light collision, and ensures a favorable external appearance of the vehicle body in a mounting part of the external environment detection device.

BRIEF DESCRIPTION OF THE DRAWING(S)

FIG. 1 is a perspective view of a front part of a vehicle to which a mounting structure for an external environment detection device according to the present invention is applied;

MODE(S) FOR CARRYING OUT THE INVENTION

A first embodiment of the present invention in which a mounting structure for an external environment detection device is applied to a vehicle is described in the following with reference to FIGS. 1 to 3.

As shown in FIG. 1, the exterior structure of the front part of the vehicle body includes a front bumper face 10 made of plastic material extending in the lateral direction, a front grille 12 made of plastic material positioned centrally above the front bumper face 10, a pair of front lights positioned above the front bumper face 10 on either side of the vehicle body, a pair of front fenders 16 made of sheet steel and also positioned above the front bumper face 10 on either side of the vehicle body, and an engine hood 18 made of sheet steel and extending between the front fenders 16.

Figure 2:
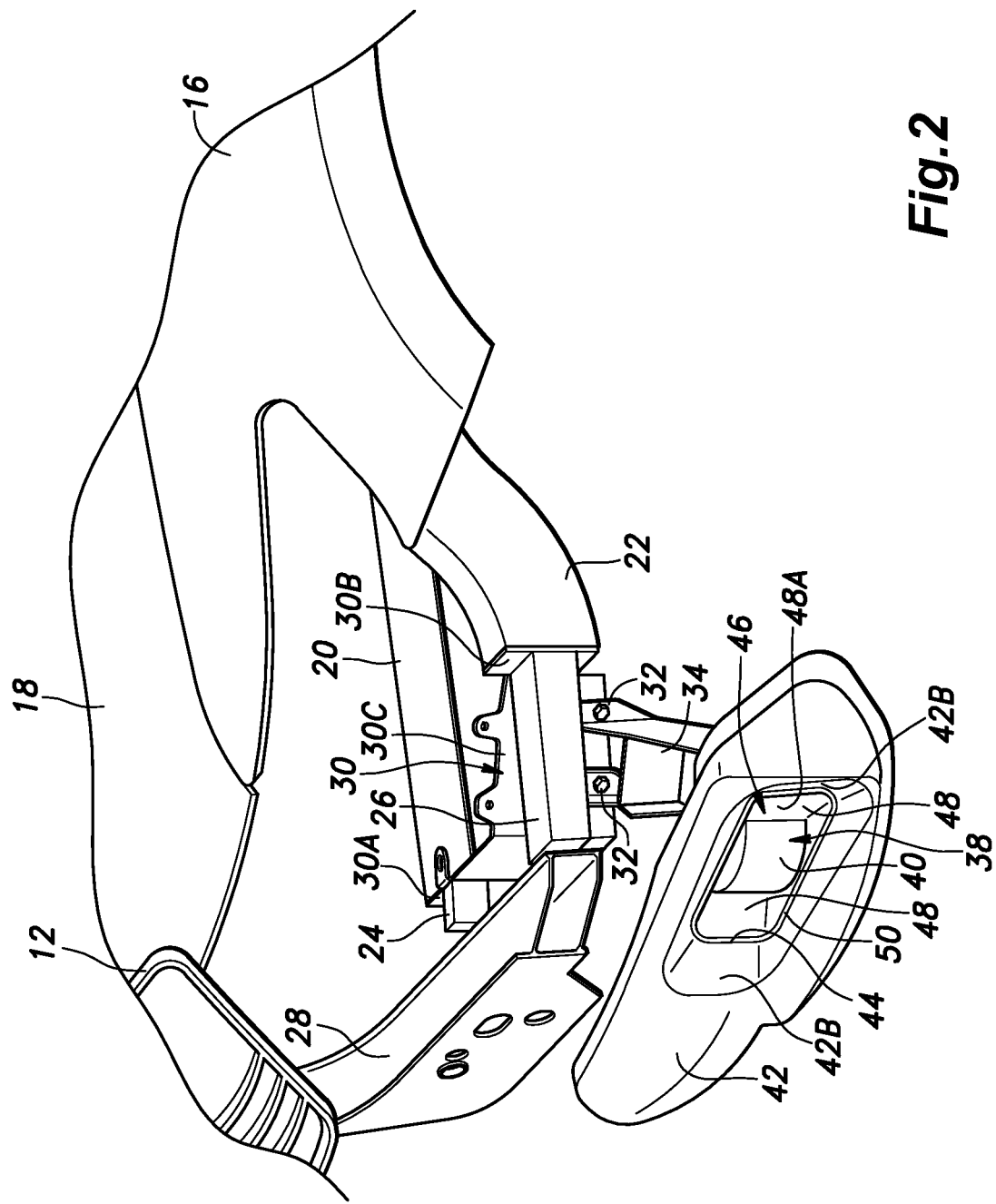
FIG. 2 is a fragmentary perspective view of a mounting structure for an external environment detection device according to a first embodiment of the present invention.

As shown in FIG. 2, the frame structure of the front part of the vehicle body includes a pair of front side frames 20 and a pair of upper members 22 made of sheet steel members having a closed cross section and extending in the fore and aft direction along either side of the vehicle body, a pair of first extension members 24 each made of a sheet steel member having a closed cross section and connected to the front end of the corresponding front side frame 20, a pair of second extension members 26 each made of a sheet steel member having a closed cross section and connected to the front end of the corresponding upper member 22, a front bumper beam 28 made of a sheet steel member having a closed cross section and extending laterally, the front bumper beam 28 having a rear side attached to the first extension members 24 and the second extension members 26, and a front side covered by the front bumper face 10, and a pair of connecting plates 30 each made of sheet steel and connecting the front end of the corresponding front side frame 20 to the front end of the corresponding upper member 22.

The first extension member 24 and the second extension member 26 are configured to be more readily deformable than the front side frames 20 and the upper members 22, respectively, so as to deform under a prescribed crash input from the front bumper beam 28 at the time of a frontal crash. By deforming, the first extension member 24 and the second extension member 26 absorb the impact of the frontal crash.

The connecting plate 30 has one end 30A which is interposed between the front side frame 20 and the first extension member 24, and is fixedly attached to these parts, and another end 30B interposed between the upper member 22 and the second extension member 26, and fixedly attached to these parts. The front end of the front side frame 20 and the front end of the upper member 22 are offset from each other in the fore and aft direction so that the connecting plate 30 includes a plate main body 30C which extends between the front side frame 20 and the front end of the upper member 22 obliquely toward the fore and aft direction.

Figure 3:
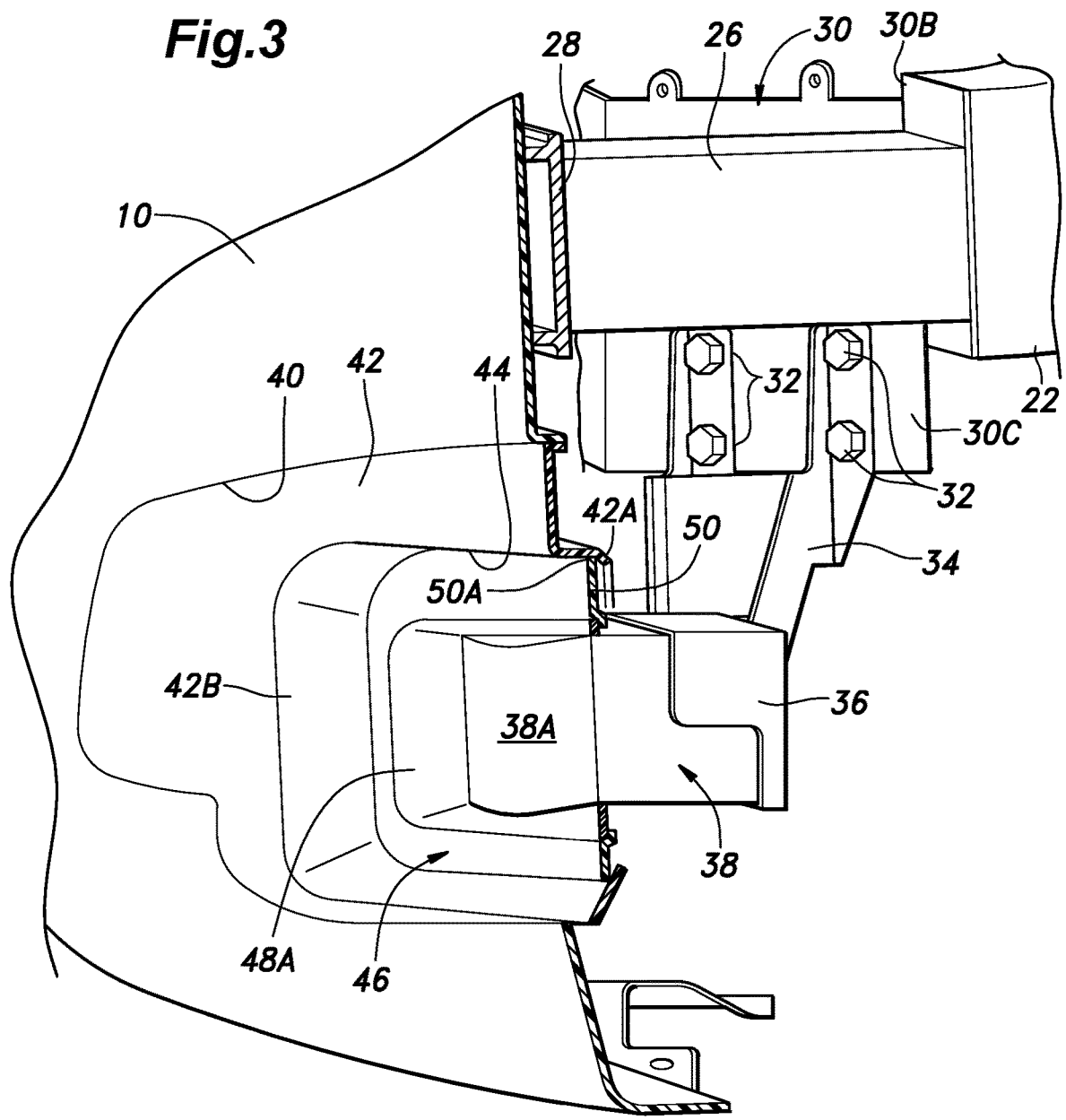
FIG. 3 is a fragmentary sectional view of the mounting structure for an external environment detection device according to the first embodiment.

As shown in FIG. 3, to the front face of the plate main body 30C is fixedly secured a base end of a metallic bracket 34 with a plurality of bolts 32. A mounting member 36 is attached to the free end (tip end) of the bracket 34. The mounting member 36 supports a detection device in the form of a laser radar device 38 for detecting the surrounding environment (such as obstacles) in a driving assist system. The laser radar device 38 has a laser emitting/receiving surface 38A through which laser light is emitted and received in a front part thereof, and is attached to the connecting plate 30 via the bracket 34 so that the laser emitting/receiving surface 38A faces forward with respect to the vehicle body, or so that the detecting direction for the surrounding environment is directed forward with respect to the vehicle body.

As shown in FIG. 1, the front bumper face 10 is provided with a pair of bumper face openings 40 passed in the fore and aft direction on either side part thereof. The front bumper face 10 is also fitted with a pair of bumper side garnishes 42 made of molded plastic members so as to close the respective bumper face openings 40. The bumper side garnishes 42 may be considered as cover members covering the exterior of the vehicle body. FIG. 1 shows that a part of the left bumper side garnish 42 located in front of the laser emitting/receiving surface 38A is formed with a laser opening 44 through which the laser emitted from the laser radar device 38 passes.

A device side garnish 46 is attached to the outer periphery of the laser radar device 38. The device side garnish 46 is made by two-color molding, and includes, as shown in FIG. 43, a tubular inner part made of relatively stiff plastic material such as polypropylene and fixedly attached to the outer periphery of the laser radar device 38, and a lip 50 (outer part) made of rubber-like elastic material such as thermo plastic olefin elastomer and fixedly secured to the outer periphery of the inner part 48. The lip 50 has a thin, sheet-like structure so as to be readily deformable in the fore and aft direction, and surrounds the outer periphery of the laser radar device 38 via the inner part 48. The lip 50 is located on the opening edge 42A of the bumper side garnish 42 which is located along the peripheral edge of the laser opening 44 in front view, and abuts against the opening edge 42A from the front side in an overlapping relationship along an outer edge 50A (outer peripheral part) thereof.

Owing to this structure, the gap between the bumper side garnish 42 and the laser radar device 38 is filled or closed by the lip 50 in front view so that the front appearance of this part improves. Since the lip 50 made of elastomeric material is brought into close contact with the opening edge 42A of the bumper side garnish 42 under elastic deformation, the gap between the bumper side garnish 42 and the laser radar device 38 can be filled by the lip 50 in reliable manner. The device side garnish 46 is secured to the laser radar device 38 at the inner part 48 thereof made of relatively rigid plastic material, so that the device side garnish 46 can be firmly secured to the laser radar device 38.

Even though the gap between the bumper side garnish 42 and the laser radar device 38 is filled by the lip 50, since the bumper side garnish 42 and the laser radar device 38 are not mechanically connected to each other, and are allowed to move relative to each other, even when the bumper side garnish 42 is pushed rearward by the front bumper face 10 at the time of a light crash or the like, the mounting position or the mounting angle of the laser radar device 38 which is fixedly attached to the connecting plate 30 is prevented from changing, and the detection angle of the laser radar device 38 is correctly maintained at all times. Also, even when the front bumper face 10 and the bumper side garnish 42 should deform owing to temperature changes or degradation over time, the mounting position or the mounting angle of the laser radar device 38 is prevented from changing, and the detection angle of the laser radar device 38 is correctly maintained at all times. Since the lip 50 made of elastomeric material insulates vibrations, the vibrations caused by the traveling of the vehicle are prevented from being transmitted from the bumper side garnish 42 to the laser radar device 38 so that such vibrations are prevented from causing a change in the detection angle of the laser radar device 38.

Since the laser radar device 38 is fixed to the connecting plate 30, the presence of the laser radar device 38 does not adversely affect the impact absorbing performance of the first extension member 24 and the second extension member 26.

The left and right sides of the inner part 48 defines inclined surfaces 48A that expands outward or diverge in the detecting direction of the laser radar device 38, or that laterally expands toward the front. Thereby, the angular range of the laser beam radiation from the laser radar device 38 in the lateral direction can be expanded.

Furthermore, the parts of the wall surface of the bumper side garnish 42 located on either side of the laser opening 44 define inclined surfaces 48B that diverge outward in the detecting direction of the laser radar device 38. This also contributes to the maximization of the angular range of the laser beam radiation from the laser radar device 38 in the lateral direction.

Figure 4:
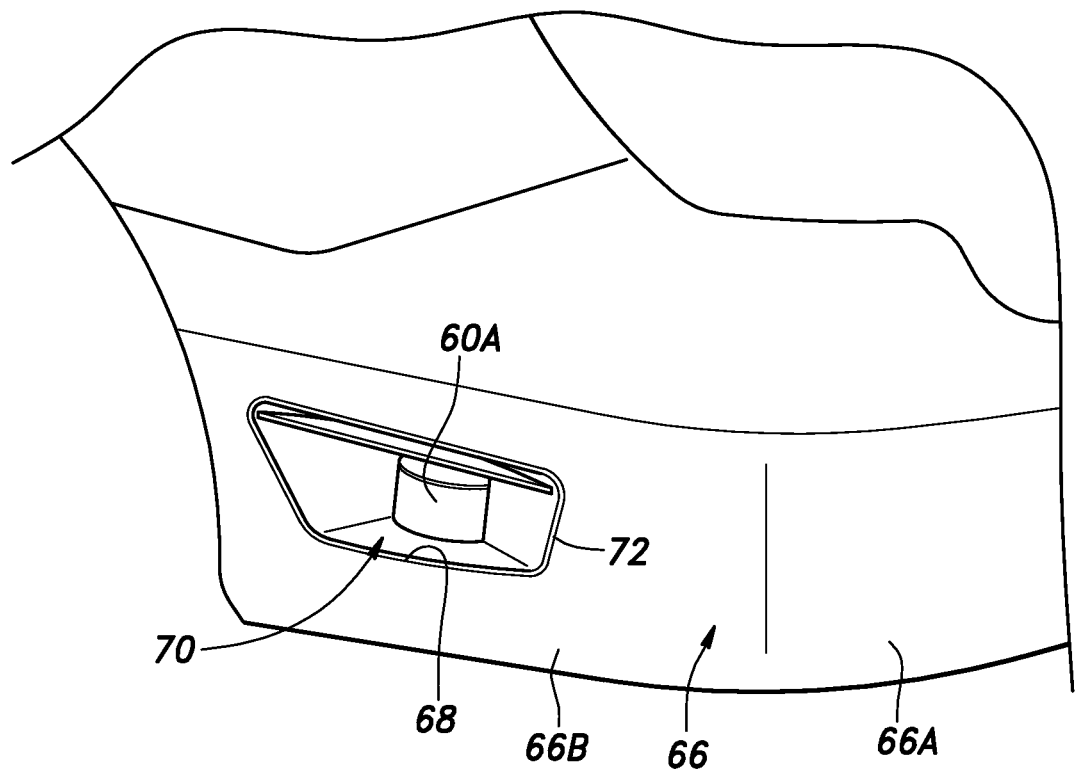
FIG. 4 is a fragmentary perspective view of a mounting structure for an external environment detection device according to a second embodiment of the present invention.
Figure 5:
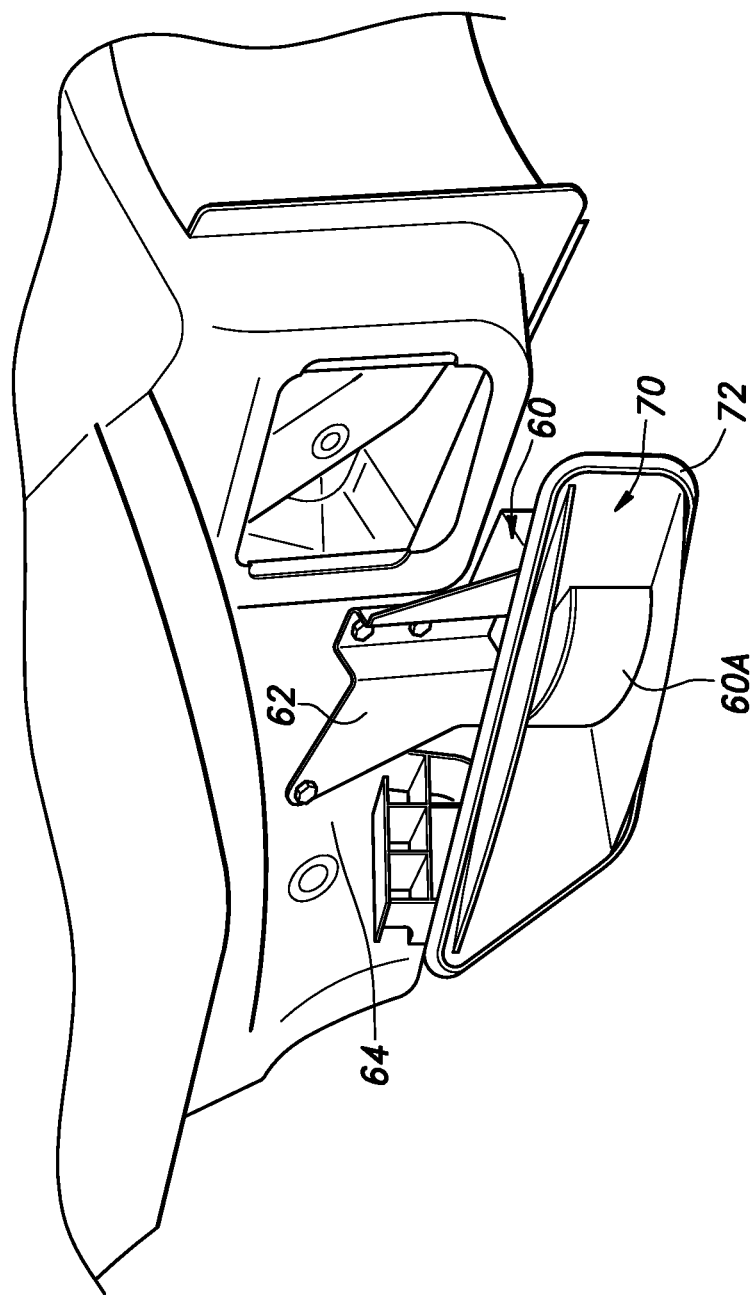
FIG. 5 is a fragmentary perspective view of the mounting structure for an external environment detection device according to the second embodiment.

A second embodiment of the present invention in which a mounting structure for an external environment detection device is applied to a vehicle is described in the following with reference to FIGS. 4 and 5.

In the second embodiment, the laser radar device 60 is attached to a rear fender 64 defining the rear side surface of the vehicle body via a bracket 62 in such a manner that the laser emitting/receiving surface 60A faces laterally with respect to the vehicle body or the detecting direction for detecting the external environment is directed sideways.

The rear bumper face 66 is a cover member that covers the exterior of the vehicle body, and has a main body 66A extending in the lateral direction at the rear end of the vehicle body, and a pair of side extensions 66B extending forward from the respective lateral ends of the main body 66A. A part of each extension 66B located in front of the laser emitting/receiving surface 60A of the laser radar device 60 is provided with a laser opening 68 for passing through the laser beam emitted from the laser radar device 60.

A device side garnish 70 is attached to the outer periphery of the laser radar device 60. The device side garnish 70 is similar to the device side garnish 46 of the first embodiment, and is provided with a lip 72 made of rubber-like elastic material such as thermo plastic olefin elastomer. The lip 72 is provided with an outer edge that overlaps, under elastic deformation, with the opening edge of the extension 66B of the rear bumper face 66 located on the peripheral edge of the laser opening 68 in side view.

Owing to this structure, the gap between the rear bumper face 66 and the laser radar device 60 is filled by the lip 72 in front view so that the front appearance of this part improves. Since the lip 72 made of elastomeric material is brought into close contact with the opening edge of the rear bumper face 66 under elastic deformation, the gap between the rear bumper face 66 and the laser radar device 60 can be filled by the lip 72 in reliable manner.

Since the rear bumper face 66 and the laser radar device 60 are not mechanically connected to each other, and are allowed to move relative to each other, even when the extension 66B of the rear bumper face 66 is pushed inward at the time of a light crash or the like, the mounting position or the mounting angle of the laser radar device 60 which is fixedly attached to the rear fender 64 is prevented from changing, and the detection angle of the laser radar device 60 is correctly maintained at all times. Also, even when the rear bumper face 66 should deform owing to temperature changes or degradation over time, the mounting position or the mounting angle of the laser radar device 60 is prevented from changing, and the detection angle of the laser radar device 60 is correctly maintained at all times. Since the lip 72 made of elastomeric material insulates vibrations, the vibrations caused by the traveling of the vehicle are prevented from being transmitted from the rear bumper face 66 to the laser radar device 60 so that such vibrations are prevented from causing a change in the detection angle of the laser radar device 60.

Figure 6:
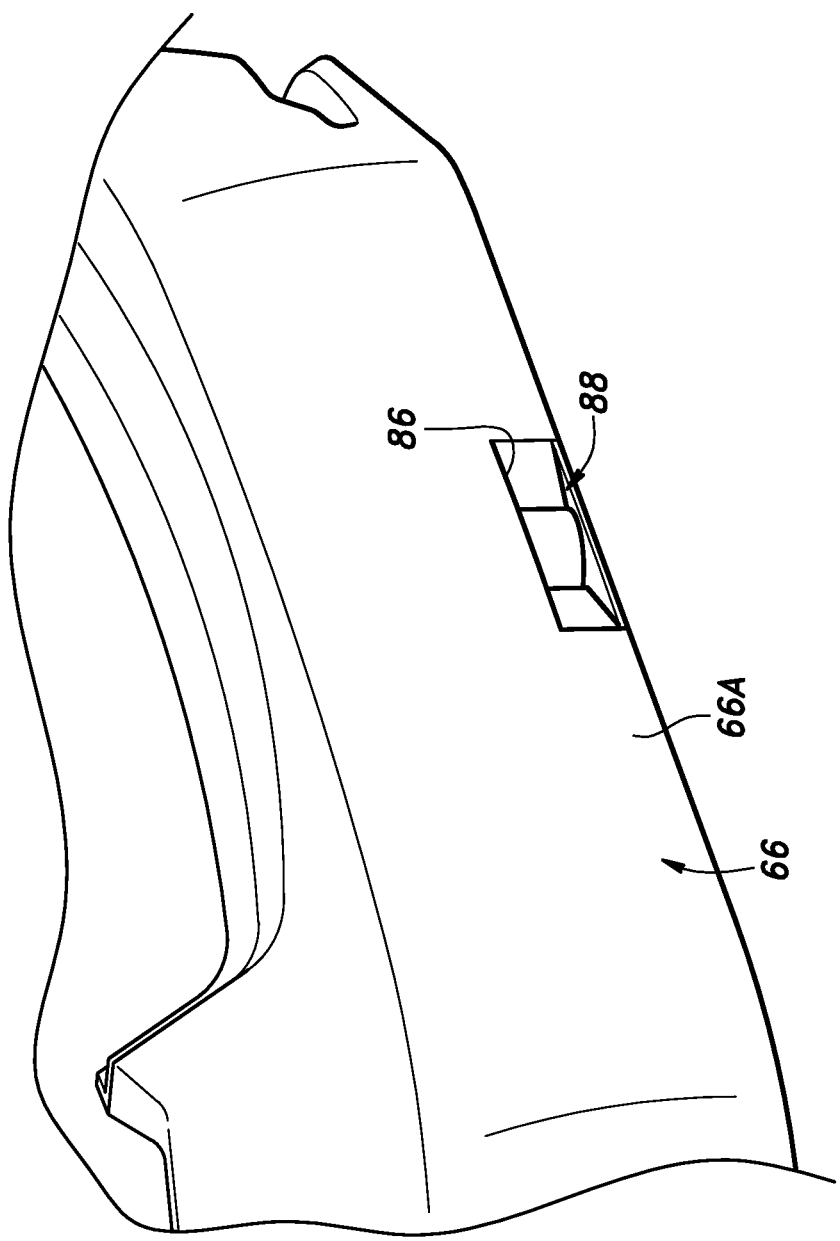
FIG. 6 is a fragmentary perspective view of a mounting structure for an external environment detection device according to a third embodiment of the present invention.
Figure 7:
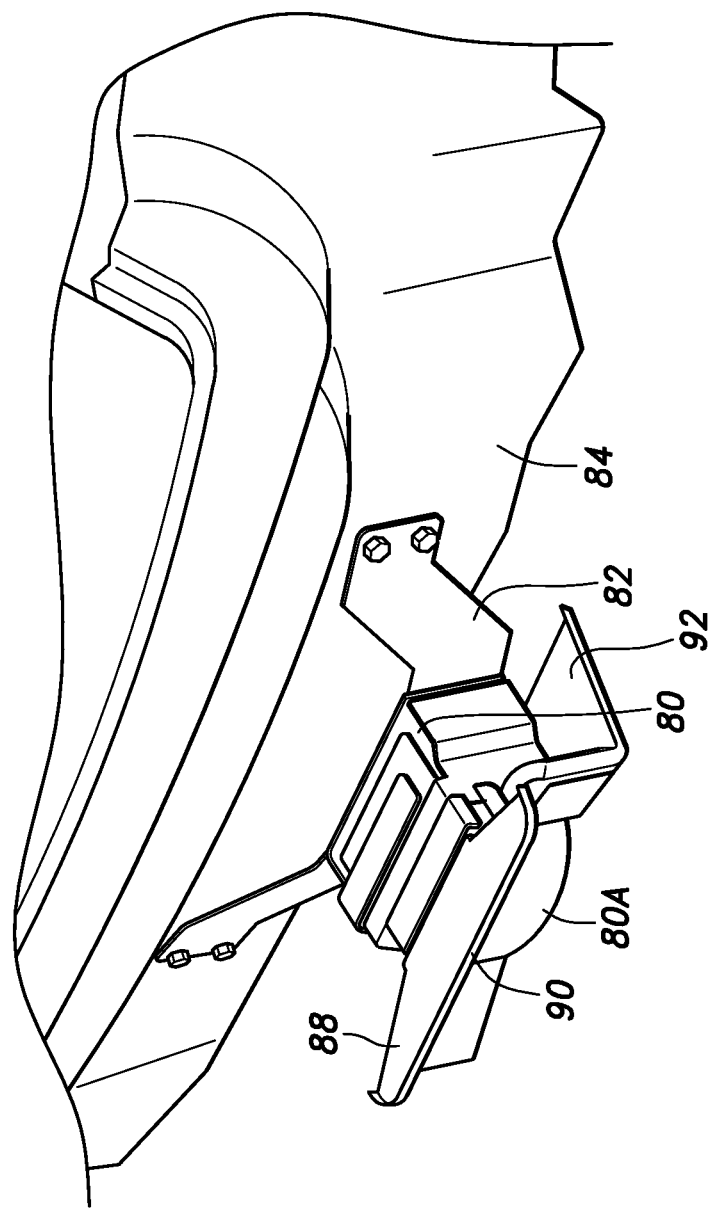
FIG. 7 is a fragmentary sectional view of the mounting structure for an external environment detection device according to the third embodiment.

A third embodiment of the present invention in which a mounting structure for an external environment detection device is applied to a vehicle is described in the following with reference to FIGS. 6 and 7.

In the third embodiment, the laser radar device 80 is attached to a rear panel 84 defining a rear end surface of the vehicle body via a bracket 82 in such a manner that the laser emitting/receiving surface 80A faces rearward with respect to the vehicle body or the detecting direction for detecting the external environment is directed rearward.

A part of the main body 66A of the rear bumper face 66 located in front of the laser emitting/receiving surface 80A of the laser radar device 80 is provided with a laser opening 86 for passing through the laser beam emitted from the laser radar device 80.

A device side garnish 88 is attached to the outer periphery of the laser radar device 80. The device side garnish 88 includes a lip 90 made of rubber-like elastic material such as thermo plastic olefin elastomer. The lip 90 is provided with an outer edge that overlaps, under elastic deformation, with the opening edge of the main body 66A of the rear bumper face 66 located on the peripheral edge of the laser opening 68 in rear view.

Owing to this structure, the gap between the rear bumper face 66 and the laser radar device 80 is filled by the lip 90 in rear view so that the rear appearance of this part improves. Since the lip 90 made of elastomeric material is brought into close contact with the opening edge of the rear bumper face 66 under elastic deformation, the gap between the rear bumper face 66 and the laser radar device 80 can be filled by the lip 90 in reliable manner.

Since the rear bumper face 66 and the laser radar device 80 are not mechanically connected to each other, and allowed to move relative to each other, even when the main body 66A of the rear bumper face 66 is pushed inward at the time of a light crash or the like, the mounting position or the mounting angle of the laser radar device 80 which is fixedly attached to the rear panel 84 is prevented from changing, and the detection angle of the laser radar device 80 is correctly maintained at all times. Also, even when the rear bumper face 66 should deform owing to temperature changes or degradation over time, the mounting position or the mounting angle of the laser radar device 80 is prevented from changing, and the detection angle of the laser radar device 80 is correctly maintained at all times. Since the lip 72 made of elastomeric material insulates vibrations, the vibrations caused by the traveling of the vehicle are prevented from being transmitted from the rear bumper face 66 to the laser radar device 80 so that such vibrations are prevented from causing a change in the detection angle of the laser radar device 80.

Further, the lip 90 is provided with a lower extension 92 extending to the lower wall of the main body 66A of the rear bumper face 66 which extends inward from the lower end of the main body 66A of the rear bumper face 66. Thereby, the laser radar device 80 can be positioned in a low position close to the lower wall of the main body 66A of the rear bumper face 66 so that the detection range of the laser radar device 80 in the rearward direction can be increased.

Figure 8:
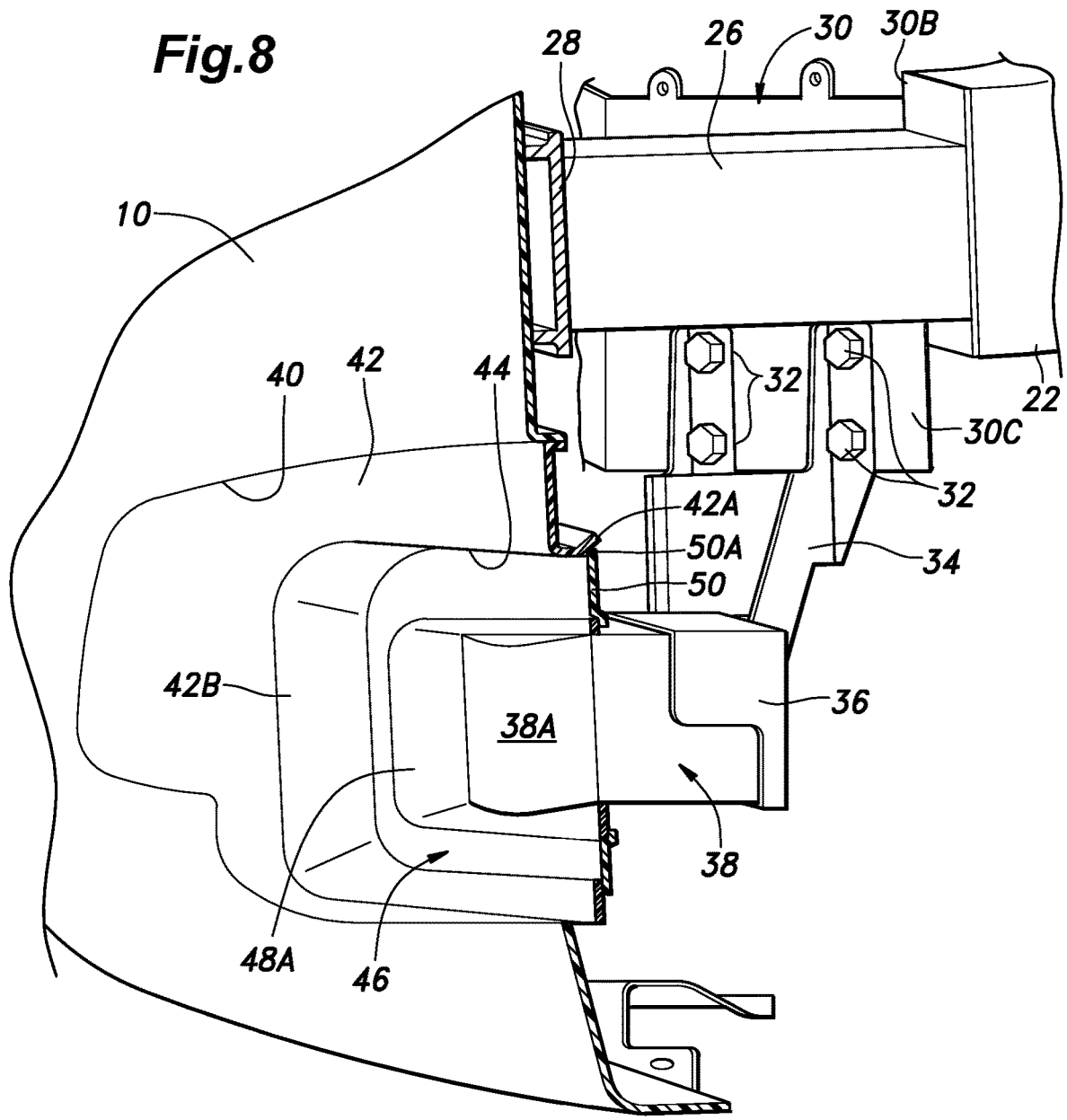
FIG. 8 is a fragmentary sectional view of a mounting structure for an external environment detection device according to yet another embodiment of the present invention.

The present invention has been described in terms of specific embodiments, but the present invention is not limited by such embodiments as can be readily understood by those skilled in the art, and can be modified in various ways without departing from the spirit of the present invention. For instance, the lip 50 overlapped with the opening edge 42A of the bumper side garnish 42 in an inward direction (from a front side) in the first embodiment, but may also overlap with the opening edge 42A of the bumper side garnish 42 in an outward direction (from a rear side) as shown in FIG. 8. The external environment detection device is not limited to the laser radar device 38, and may also be other forms of external environment detection devices such as a millimeter wave radar device and a camera device. Moreover, the various components used in the above embodiment are not necessarily essential, but can be suitably substituted and omitted as required without departing from the spirit of the present invention.

Glossary of Terms

| | |
|---|---|
| 10: front bumper face | 12: front grille |
| 14: front light | 16: front fender |
| 18: engine hood | 20: front side frame |
| 22: upper member | 24: first extension member |
| 26: second extension member | 28: front bumper beam |
| 30: connecting plate | 30A: one end |
| 30B: other end | 30C: plate main body |
| 32: bolt | 34: bracket |
| 36: mounting member | 38: laser radar device |
| 38A: laser emitting/receiving surface | 40: bumper face side opening |
| 42: bumper side garnish | 42A: opening edge |
| 42A: inclined surface | 44: laser opening |
| 46: device side garnish | 48: inner part |
| 48A: inclined surface | 50: lip |
| 50A: outer edge | 60: laser radar device |
| 60A: laser emitting/receiving surface | 62: bracket |
| 64: rear fender | 66: rear bumper face |
| 66A: main body | 66B: side extension |
| 68: laser opening | 70: device side garnish |
| 72: lip | 80: laser radar device |
| 80A: laser emitting/receiving surface | 82: bracket |
| 84: rear panel | 86: laser opening |
| 88: device side garnish | 90: lip |
| 92: lower extension | |

The invention claimed is:

1. A mounting structure for mounting an external environment detection device for a vehicle to a vehicle body so as to face a prescribed detecting direction, comprising:

a cover member covering an exterior of the vehicle body and having an opening facing the prescribed detecting direction of the detection device; and a device side garnish extending from an outer periphery of the detection device, and including a lip that overlaps with an opening edge of the cover member located on a periphery of the opening.

2. The mounting structure for mounting an external environment detection device for a vehicle according to claim 1, wherein the lip engages the opening edge of the cover member from inside.

3. The mounting structure for mounting an external environment detection device for a vehicle according to claim 1, wherein the lip engages the opening edge of the cover member from outside.

4. The mounting structure for mounting an external environment detection device for a vehicle according to claim 1, wherein the lip is made of elastomeric material.

5. The mounting structure for mounting an external environment detection device for a vehicle according to claim 1, wherein the device side garnish includes a relatively rigid inner part fixedly attached to the outer periphery of the detection device, and an outer part constituting the lip made of elastomeric material.

6. The mounting structure for mounting an external environment detection device for a vehicle according to claim 5, wherein the inner part is shaped to define an inclined surface that diverges outward in the detecting direction.

7. The mounting structure for mounting an external environment detection device for a vehicle according to claim 1, wherein the opening edge of the cover member is shaped to define an inclined surface that diverges outward in the detecting direction.

8. The mounting structure for mounting an external environment detection device for a vehicle according to claim 1, wherein the cover member consists of a bumper side garnish attached to a bumper face.

9. The mounting structure for mounting an external environment detection device for a vehicle according to claim 1, wherein the cover member consists of a bumper face.

10. The mounting structure for mounting an external environment detection device for a vehicle according to claim 9, wherein the lip includes a lower extension extending to a lower wall of the bumper face that extends inward from a lower edge of the bumper face.

11. The mounting structure for mounting an external environment detection device for a vehicle according to claim 9, wherein the vehicle body comprises a pair of extension members extending from a front end of a front side frame and a front end of an upper member, respectively, to support a front bumper beam, and a connecting plate connecting the extension members to each other, and the bumper face is a front bumper face, the detection device being attached to the connecting plate via a bracket.

12. The mounting structure for mounting an external environment detection device for a vehicle according to claim 9, wherein the bumper face is a rear bumper face, and the detection device is attached to a rear fender defining a rear side face of the vehicle body via a bracket.

13. The mounting structure for mounting an external environment detection device for a vehicle according to claim 9, wherein the bumper face is a rear bumper face, and the detection device is attached to a rear panel defining a rear end face of the vehicle body via a bracket.

* * * * *